Feb. 17, 1970  T. M. JOHNSON  3,495,471

GEAR LUBRICATING MEANS

Filed April 2, 1968

INVENTOR.
THOMAS M. JOHNSON
BY
*M. N. Cleare*
ATTORNEY

United States Patent Office 3,495,471
Patented Feb. 17, 1970

3,495,471
GEAR LUBRICATING MEANS
Thomas M. Johnson, 1031 19th Ave. N.,
Texas City, Tex. 77590
Filed Apr. 2, 1968, Ser. No. 725,248
Int. Cl. F16h 57/04
U.S. Cl. 74—467          8 Claims

ABSTRACT OF THE DISCLOSURE

A gear lubricating system for lubricating the contacting surfaces of a gear which in operation intermeshes with at least one other gear, the lubricating system including a gear having a plurality of teeth, the gear being provided with a circular channel coaxial with the gear which channel serves as a reservoir for lubricant. Lubricating conduits connect through and within the gear to this circular channel and the peripheral surface of the gear adjacent the base of each tooth on the side of the tooth which provides a contacting surface when the gear intermeshes with other gears. Lubricant is supplied to the circular channel from an external source, either directly or indirectly.

BACKGROUND OF THE INVENTION

The present invention relates to means for the lubrication of gears. More particularly, the present invention relates to means for providing lubricant at points of contact of meshing gears, particularly those that operate at high speeds.

Meshing gears, particularly those that travel at high speeds, must be well lubricated at all times to prevent excessive wear of the contacting portions of the gears. One conventional means for lubricating gears provides for a portion of the gear to continuously pass through a reservoir of lubricant. With such means, rotation of the gears is relied upon to distribute oil to the points of contact of the meshing gears. Particularly with high speed gears, this means quite often is unsatisfactory. The centrifugal force produced by the rapidly rotating gears tends to throw the lubricant from the contacting points of the gear before these points come into contact with the meshing gear or gears. Also, as a result of the amount of lubricant thrown from the gear by centrifugal force, an amount of lubricant in excess of that actually needed for lubrication is required. Additionally, unless considerable care is taken, the throwing of the lubricant from the gears results in a significant housekeeping problem.

Another conventional means for lubricating the contacting surfaces of meshing gears provides for the spraying of lubricant onto these surfaces. Such means usually require larger quantities of lubricant than is actually required for adequate lubrication of the gears and in general, do not provide adequate lubrication for maximum performance of the meshing gears, particularly those that operate at high speeds.

It is an object of the present invention to provide a more effective lubricating means for meshing gears. Another object of the present invention is to provide a new and novel lubricating means for gears whereby the contacting surfaces of meshing gears are more effectively and efficiently lubricated. Still another object of the present invention is to provide a new and novel lubricating means for gears whereby the lubricant is continuously supplied directly to the contacting surfaces of the teeth of meshing gears. An additional object of the present invention is to provide a new and novel lubricating means for gears which results in a more efficient use of the lubricant supplied. A remaining object of the present invention is to provide a new and novel lubricating system for meshing gears, particularly those that rotate at high speeds, which does not require splashing or spraying lubricant into the area of the contacting surfaces of the gears and which provides substantially less housekeeping problem than other conventional lubricating systems. Additional objects will become apparent from the following description of the invention herein disclosed.

SUMMARY OF THE INVENTION

The present invention, which fulfills the above and other objects, is a lubricating system for lubricating the contacting surfaces of a gear which in operation intermeshes with at least one other gear, said lubricating system comprising a gear including a circular channel coaxial with said gear, a plurality of gear teeth extending from the peripheral surface of said gear, at least one lubricating conduit for each of said gear teeth, said lubricating conduit extending within said gear and in open communication at one end with said circular channel and at the other end opening to said peripheral surface adjacent the base of a gear tooth on the side of said gear tooth providing a contacting surface during operation; and means for introducing lubricant into said channel.

The above described lubricating system provides for a maximum effective utilization of lubricant in lubricating meshing gears. The lubricant is passed directly to the surface upon which it is most needed, thereby reducing the amount of lubricant supplied to provide effective lubrication. Also, this system provides more effective lubrication than presently known means of lubricating meshing gears, particularly those that are operated at high speeds, i.e., 40,000 to 50,000 revolutions per minute and higher.

DESCRIPTION OF THE PREFERRED EMBODIMENT

Figure 1:
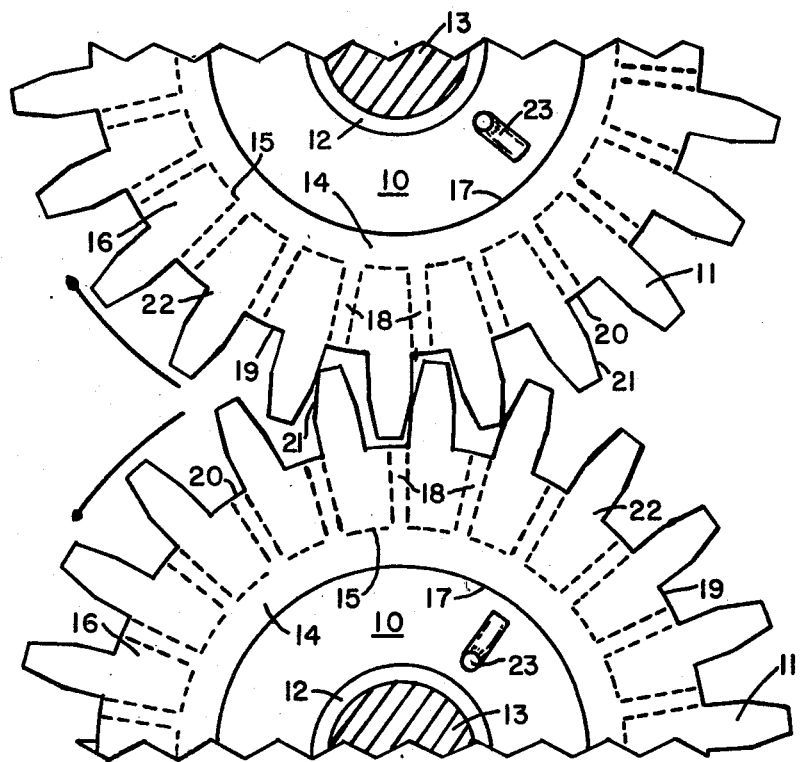
FIGURE 1 is a top view of segments of two intermeshing gears, each gear including an embodiment of the lubricating means of the present invention.

To describe the preferred embodiments of the present invention, reference is made to the accompanying drawings. In the drawings, the same reference characters are used throughout to denote like features of the lubricating system of the present invention.

Referring to the drawings, a gear 10 having a plurality of gear teeth 11 is shown. Gear 10 is affixed through shaft sleeve 12 to a shaft 13 through which rotational motion is imparted to gear 10.

In accordance with the present invention, gear 10 is provided with a circular channel 14 which is coaxial with gear 10. Circular channel 14 provides a reservoir for lubricant from which the lubricant is distributed to the contacting surfaces of gear 10 as hereinbelow described.

Figure 2:
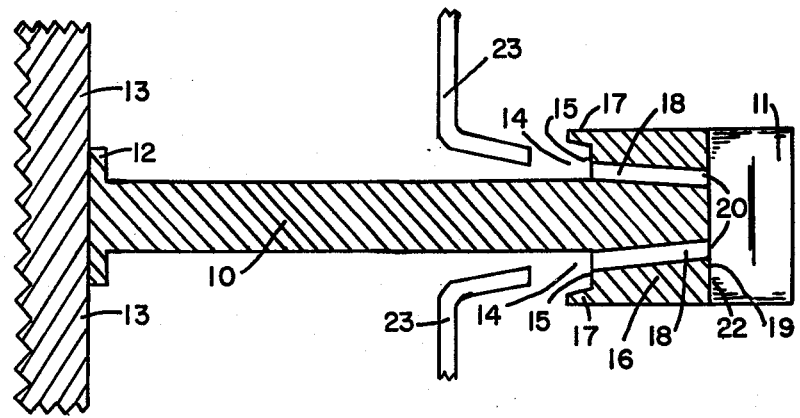
FIGURE 2 is a cross-sectional view of a segment of a gear including an embodiment of the lubricating means of the present invention.

In a particularly useful embodiment of the present invention, as shown in FIGURES 1 and 2, circular channel 14 is formed by inner edge 15 of rim 16 of gear 10 including an inwardly projecting lip 17 thereof together with the surface of gear 10. As lubricant is introduced into circular channel 14, the centrifugal force generated by rotation of gear 10 retains the lubricant within circular channel 14 except, of course, that portion of the lubricant continuously distributed to the contacting surfaces. Obviously, if circular channel 14 is not completely enclosed as in the embodiment illustrated in the drawings, the unenclosed portion of the channel must be a portion nearer to the axis of the gear, otherwise the centrifugal force of the rotating gear will force lubricant from circular channel 14 rather than retain it therein.

In other embodiments of the present invention, circular channel 14 may be completely enclosed except for occasional openings to means for introducing lubricant into circular channel 14. Additionally, circular channel 14 need not of necessity be formed by rim 16, projecting lip 17, inner surface 15 of rim 16 and the surface of gear 10 but may actually lie within gear 10 rather than partially upon the surface thereof as shown in FIGURES 1 and 2. Quite often, circular channel 14 has a substantially half circular cross-section, though the cross-section may define other shapes. Since the purpose of circular channel 14, as noted above, is to provide a reservoir for lubricant from which said lubricant is readily distributed to the contacting areas of gear 10 by the centrifugal force created by rotation of gear 10, the basic requirement for the cross-sectional design of circular channel 14 is good flow characteristics whereby lubricant may flow within said reservoir to the passages or lubricating conduits 18 which provide for distribution of lubricant from circular channel 14. The design of such circular channel is readily within the ability of those skilled in the art.

As noted above, distribution of lubricant from circular channel 14 is through passages or lubricating conduits 18 which extend from circular channel 14 through and within gear 10 to the outer peripheral surface 19 of gear 10 to thereby form opening 20, in the outer peripheral surface 19. Through opening 20, lubricant is introduced onto contacting surfaces 21 of gear teeth 11. To provide for the lubricant to be introduced onto the contacting surfaces 21, opening 20 is adjacent base 22 of gear teeth 11 on the side of said gear teeth which includes contacting surface 21 when said gear teeth intermesh with gear teeth of other gears during operation.

While FIGURE 2 illustrates gear 10 as having two circular channels 14, one on the upper side and one on the lower side of said gear, with separate lubricating conduits 18 extending from each circular channel 14 to each of two separated openings 20 for lubrication of a single contacting surface 21, the present invention may include only one of such circular channels 14 with a single lubricating conduit 18 extending therefrom. Additionally, other modifications of the arrangement of circular channel 14 and lubricating conduit 18 may be used. For example, while a single circular channel 14 may be provided, two or more spaced apart lubricating conduits 18 from such circular channel to each gear tooth 11 may be employed. Alternatively, two circular channels may be used, one on the upper side and one on the lower side of gear 10, but with lubricating conduits extending from each to adjacent the base of alternate gear teeth. Of course, other such modifications may be employed for particular situations and purposes but so long as these modifications combine features of the present invention to accomplish the purposes fulfilled by the present invention, such modifications are within the spirit and scope of the present invention.

As used herein, the term "contacting surface" used with respect to the gear or gear teeth, refers to the side of the gear teeth which is frictionally engaged with the teeth of meshing gears. For the driving gear of meshing gears, the contacting surfaces of the gear teeth generally may be defined as the side of the gear teeth adjacent the direction of rotation of the gear. For example, if the driving gear rotates counterclockwise as viewed, then the contacting surfaces of such gear teeth are the lefthand surfaces thereof as viewed from the same point. With respect to the driven gear or gears of meshing gears, the contacting surfaces generally may be defined as the side of the gear teeth opposite the direction of rotation which is to say that if the driven gear is rotated clockwise, then the contacting surfaces of the gear teeth are the lefthand sides as viewed from the same point. The above definition is clearly illustrated by FIGURE 1 wherein the direction of rotation is shown by arrows.

Lubricant is continuously or intermittently, as needed or desired, supplied to circular channel 14 by means of one or more supply tubes 23 which are arranged such as to direct lubricant into circular channel 14. In order to more evenly balance gears revolving at high speed, it is often desirable to arrange for two or more supply tubes 23 substantially equidistantly spaced from one another and from the axis of the gear thereby insuring a more uniform distribution of lubricant within circular channel 14. The lubricant supply tubes may be completely separate from the gear as shown in FIGURES 1 and 2 and may extend from a central lubricant supply (not shown) to a point sufficiently near but out of contact with said gear to permit lubricant to be forced directly into the circular channel. As an alternative, lubricant may be introduced into circular channel 14 via a passageway drilled through shaft 13 in connection with tubes extending from such passageway to the circular channel. Such tubes may be out of contact with the gear or may lie either on the surface or within the gear.

In a preferred practice of the present invention, one of supply tubes 23 is positioned similarly to that shown in FIGURE 1. Such positioning provides for lubricant to be introduced into circular channel 14 at a point sufficiently in advance of the radius of the gear extending from the axis to the meshing teeth of said gear to insure the distribution of an adequate supply of lubricant to the contacting surfaces. In such positioning, supply tube 23 usually introduces lubricant into circular channel 14 in the quadrant of the circle described thereby which is bounded on one side by the radius of the gear extending from the axis thereof to the meshing gear teeth and is on the side of such radius opposite the direction of rotation of the gear. The optimum point of introduction of the lubricant into circular channel 14 will depend on the number of supply tubes 23 employed, the speed of rotation of the gear, the amount of lubricant continuously retained in circular channel 14, and other such factors.

In operation, lubricant is pumped through lubricant supply tube 23 into circular channel 14. From circular channel 14, the lubricant is forced through lubricating conduits 18 by the centrifugal force generated by rotation of gear 10. The lubricant emerges from liquid conduit 18 through opening 20 which is adjacent base 22 of a gear tooth 11 on the side thereof having contacting surface 21. Centrifugal force then causes the lubricant to travel from base 22 of gear tooth 11 along said gear tooth to the contacting surface 21. The contacting surface 21 thereby receives the lubricant.

What is claimed is:

1. A lubricating system for lubricating the contacting surfaces of gears which in operation intermesh with at least one other gear, said lubricating system including a gear comprising a circular channel coaxial with said gear, a plurality of gear teeth extending from the peripheral surface of said gear, at least one lubricating conduit for each of said gear teeth, said lubricating conduit extending within said gear and in open communication at one end with said circular channel and at the other end opening to said peripheral surface of said gear, each of said openings being adjacent the base of a gear tooth on the side of said gear tooth providing a contacting surface during operation; and means for introducing lubricant into said circular channel.

2. The lubricating system of claim 1 wherein said circular channel is formed by the inner edge of the rim of said gear together with the surface of said gear.

3. The lubricating system of claim 2 wherein said means for introducing lubricant into said circular channel comprises a supply tube extending from a central lubricant supply source to a point sufficiently near but out of contact with said gear to permit lubricant to be sprayed directly into said circular channel.

4. The lubricating system of claim 1 wherein a circular channel is provided on either side of said gear.

5. The lubricating system of claim 4 wherein a lubricating conduit extends from each of said circular channels to adjacent the base of each of the gear teeth.

6. A gear comprising a gear body, a circular channel coaxial with said gear body, a plurality of gear teeth extending from the peripheral surface of said gear, at least one lubricating conduit for each of said gear teeth, said lubricating conduit extending within said gear and in open communication at one end with said circular channel and at the other end opening to said peripheral surface of said gear, each of said openings being adjacent the base of a gear tooth on the side of said gear tooth providing a contacting surface when said gear intermeshes with another gear.

7. The gear of claim 6 wherein said circular channel is formed by the inner edge of the rim of said gear together with the surface of said gear.

8. The gear of claim 6 wherein a circular channel is provided on either side of said gear.

References Cited

UNITED STATES PATENTS

| 1,170,057 | 2/1916 | Farnum | 74—464 |
| 1,186,434 | 6/1916 | Pierce | 74—234 |
| 1,502,083 | 7/1924 | Zoelly | 74—468 |
| 3,424,022 | 1/1969 | Greenberg et al. | 74—409 |

LEONARD H. GERIN, Primary Examiner